(12) United States Patent
Mizuno et al.

(10) Patent No.: US 6,302,173 B1
(45) Date of Patent: *Oct. 16, 2001

(54) VEHICLE TIRE INCLUDING CONDUCTIVE RUBBER

(75) Inventors: Youichi Mizuno, Akashi; Masato Komatsuki, Takasago; Isamu Tsumori, Amagasaki, all of (JP)

(73) Assignee: Sumitomo Rubber Industries, Limited, Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,127

(22) Filed: May 12, 1998

(30) Foreign Application Priority Data

May 12, 1997 (JP) .................................................. 9-121027
Jun. 19, 1997 (JP) .................................................. 9-162892
Dec. 19, 1997 (JP) .................................................. 9-351117

(51) Int. Cl.[7] .............................. B60C 1/00; B60C 11/00; B60C 19/08
(52) U.S. Cl. ................................... 152/152.1; 152/209.4; 152/209.5; 152/458; 152/DIG. 2
(58) Field of Search ............................. 152/152.1, 209.4, 152/209.5, 905, DIG. 2, 458; 428/295.1, 296.4, 296.7

(56) References Cited

U.S. PATENT DOCUMENTS

| | | | |
|---|---|---|---|
| 2,084,523 | * 6/1937 | Crawford | 152/DIG. 2 |
| 3,759,306 | * 9/1973 | Greiner et al. | 152/209.4 |
| 3,837,986 | * 9/1974 | Gorter et al. | 152/458 |
| 4,374,893 | * 2/1983 | Arsac et al. | 428/263 |
| 4,877,646 | * 10/1989 | Kuhn et al. | 428/265 |
| 5,248,553 | * 9/1993 | Miyashita et al. | 428/297 |
| 5,518,055 | * 5/1996 | Teeple et al. | 152/DIG. 2 |
| 5,526,859 | * 6/1996 | Saito et al. | 152/209.5 |
| 5,576,104 | * 11/1996 | Cavsa et al. | 152/450 |
| 5,591,279 | * 1/1997 | Midorikawa et al. | 152/209.4 |
| 5,718,781 | * 2/1998 | Verthe et al. | 152/DIG. 2 |
| 5,743,973 | * 4/1998 | Krishnan et al. | 152/152.1 |
| 6,044,882 | * 4/2000 | Crawford et al. | 152/152.1 |

FOREIGN PATENT DOCUMENTS

| | | | |
|---|---|---|---|
| 0356994A1 | 7/1990 | (EP) . | |
| 658452 | * 6/1995 | (EP) | 152/DIG. 2 |
| 718127 | * 6/1996 | (EP) | 152/209.5 |
| 670250 | * 10/1964 | (IT) | 152/DIG. 2 |
| 03074202 | 3/1991 | (JP) . | |
| 3-74202 | * 3/1991 | (JP) | 152/152.1 |
| 7-8303 | * 1/1995 | (JP) . | |
| WO9840229A1 | 9/1998 | (WO) . | |

* cited by examiner

*Primary Examiner*—Steven D. Maki
(74) *Attorney, Agent, or Firm*—Birch, Stewart, Kolasch & Birch, LLP

(57) ABSTRACT

A tire of which tread rubber comprises a conducive rubber at least partially, the conducive rubber extending from the radially inner surface of the tread rubber to the ground contacting face, and the conducive rubber compounded from 100 parts by weight of diene rubber and 2 to 30 parts by weight of conductive short fibers, the conductive short fibers formed by coating reinforcing short fibers with a conductive substance, and the conductive rubber has a volume resistance of less than $1 \times 10^8$ ohm cm.

17 Claims, 7 Drawing Sheets

(A)

(B)

VEHICLE TIRE INCLUDING CONDUCTIVE RUBBER

The present invention relates to a vehicle tire improved in the rolling resistance and electrical conductivity, more particularly to an improved tread rubber decreased in the electrical resistance as well as hysteresis loss.

In recent years, from a point of view of environmental issues such as global warming, it is a main theme to decrease the rolling resistance of pneumatic tires, and many attempts have been made, and now tread rubber compounds reinforced by silica instead of conventional carbon black are regarded as very hopeful.

Such compounds have a very low hysteresis loss, but the electrical resistance is very high. Accordingly, if tires whose tread portion is made of such insulation rubber, the vehicle body is electrostatically charged, and problems such as car fire, radio noise, disturbing of light electrical appliances and the like arise.

In order to solve this problem, in the published Japanese patent application No. JP-A-9-71112, we proposed a tire in which most of the tread rubber is made of an insulation rubber, but to discharge the static electricity a conductive rubber compound is partially disposed, wherein the conductivity is provided by adding conductive small solid substance such as carbon black or powdered metal. It is better to decrease the volume of the conductive rubber for decreasing the hysteresis loss. In this case, however, the carbon black content is inevitably increased to obtain a necessary conductivity. As a result, in regard to the hardness, wear resistance and the like, it is liable to become difficult to keep a proper balance between the conductive rubber and low hysteresis loss rubber. Further, the increased hysteresis loss of the conducive rubber by the addition of carbon black is liable to void the improved rolling resistance.

It is therefor an object of the present invention to provide a tire of which rolling resistance and conductivity are improved by decreasing the carbon black content of the tread rubber and adding conductive reinforcing short fibers instead.

According to the present invention, a tire comprises a tread rubber of which radially outer surface forms the ground contacting face of the tire, the tread rubber comprising a conductive rubber at least partially, the conducive rubber extending from the radially inner surface of the tread rubber to the ground contacting face, the conducive rubber is compounded from
100 parts by weight of diene rubber and
2 to 30 parts by weight of conductive short fibers, the conducive short fibers formed by coating reinforcing short fibers with a conductive substance, and the conductive rubber has a velum resistance of less than $1 \times 10^8$ ohm cm.

Embodiments of the present invention will now be described in detail in conjunction with the accompanying drawings.

Figure 1:
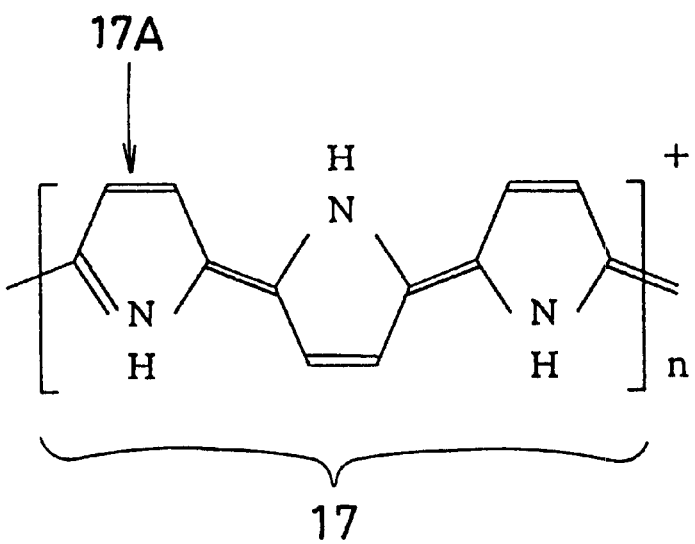
FIG. 1(A) is a chemical formula of a pyrrole chain.
FIG. 1(B) is a chemical formula of an aniline chain.
Figure 1:
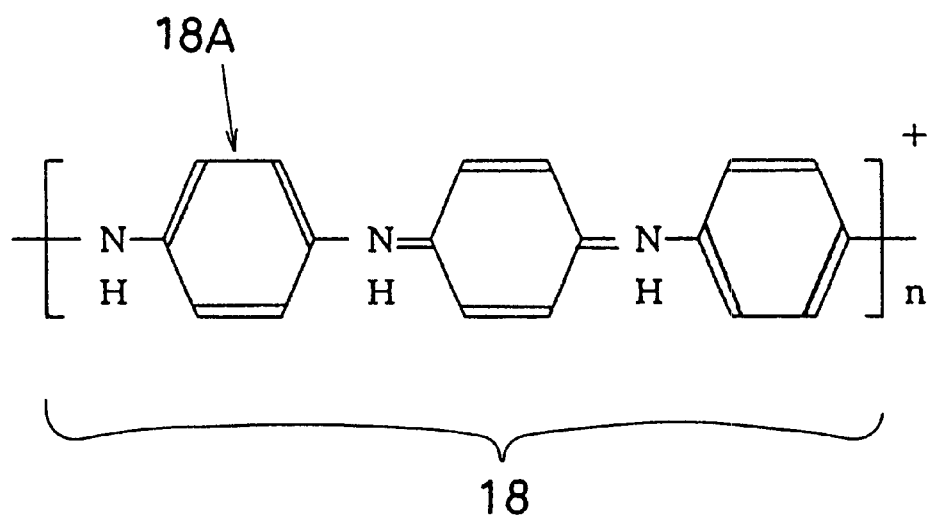

In the drawings, tires according to the present invention are a pneumatic tire comprising a tread portion 2, a pair of axially spaced bead portions 4 with a bead core 5 therein, a pair of sidewall portions 3 extending between the tread edges and the bead portions 4, a toroidal carcass 6 extending between the bead portions 4, and a belt 7 disposed radially outside the carcass 6 and inside a tread rubber 9.

The carcass 6 comprises at least on ply of cords extending between the bead portions 4 and turned up around the bead cores 5 to form a pair of turnup portions and a main portion therebetween. For the carcass cords, steel cords and organic fibers cords, e.g. polyester, nylon, rayon, aromatic polyamide and the like can be used.

The belt 7 usually comprises two cross plies so called breaker ply. For the breaker belt cords, steel cords are preferably used. It is also possible that the belt further comprises a band ply having a substantially zero cord angle to the tire circumferential direction.

Each of the bead portion 4 is usually provided between the carcass ply turnup portion and main portion with a bead apex B made of hard rubber tapering radially outwardly.

The tread rubber 9 is disposed on the radially outside of the belt 7 to form the tread portion 2, and the tire tread or ground contacting face 2S is defined by the radially outer surface of the tread rubber.

According to the present invention, the tread rubber 9 comprises a conductive rubber compound 10 at least partially. The conducive rubber compound 10 extends from the radially inner surface to the radially outer surface of the tread rubber 9 to form at least part of the ground contacting face 2S of the tire.

The conductive rubber compound 10 is made of 100 parts by weight of a base rubber compound and 2 to 30 parts by weight of conductive short fibers mixed therein.

If the conductive short fibers exceeds 30 parts by weight, the energy loss between the conductive short fibers and rubber abruptly increase, and the rolling resistance is hindered from being decreased. Further, the conductive rubber compound is increased in the complex elastic modulus and the wet performance decreases. Accordingly, the conductive short fiber content is not more than 30 parts by weight. If less than 2 parts by weight, it becomes impossible to obtain even a required minimal conductivity.

The conductive short fibers are formed by coating reinforcing short fibers with a conductive substance.

For the reinforcing short fibers: synthetic organic fibers, e.g. nylon, rayon, vinylon, polyethylene, polystyrene, polyvinyl chloride, polyvinylidene chloride, aromatic polyamide, polyethylene terephthalate, polypropylene, cellulose and the like; plant fibers made of cellulose and the like such as pulp; and inorganic fibers, e.g. glass, alumina and the like can be used.

To maintain plasticity of the finished rubber, organic fibers such as nylon fibers and pulp are preferably used. Especially nylon fibers are preferable for the superior extensibility, flexibility and strength.

In view of the conductivity of the finished rubber, fine fibers are preferably used. However, if the fibers are too fine, it is liable to be entangled and the dispersion of the fibers in the compound is hindered. Therefor, the diameter D is preferably in the range of from 1 to 100 micro meters.

The length L of the reinforcing short fibers is preferable in the range of from 10 to 6000 micro meters in view of the reinforcing effect. If the length is outside this range, the dispersion of the fibers in the compound is liable to be hindered and it becomes difficult to obtain the desired performance.

The ratio L/D of the fiber length L to the fiber diameter D is preferably 10 to 2000. If L/D is less than 10, the dispersion of the fibers becomes difficult. If more than 2000, in the ground contacting face of the tire, microscopic rubber breaks are caused by the reinforcing short fibers and the wear resistance is decreased. Further, the mutually contacting conducive short fibers excessively increase, which increases the internal energy loss and the rolling resistance is liable to increase.

For the conductive substance for coating the reinforcing short fibers, conductive polymers of which principal chain has pi-electron conjugation, for example, polypyrrole, polyaniline, alkylenoxide and the like and metal salts can be used.

In view of the adhesion to the reinforcing short fibers, conductive polymers are preferably used. Especially, compounds having a polypyrrole framework structure or a polyaniline framework structure are preferably used for the stable conductivity. Here, the compound having a polypyrrole framework structure is, as shown in FIG. 1(A), a compound each polymer of which has the principal chain which is a pyrrole chain 17 made up of pyrrole rings 17A. The compound having a polyaniline framework structure is a compound each polymer of which has the principal chain which is, as shown in FIG. 1(B), an aniline chain 18 made up of anilino rings 18A.

When such conductive polymers are used, it is preferable for improving the conductivity further more to add a small quantity of an electron-accepting substance such as iodine, arsenic(V)fluoride and the like or an electron-donating substance such as potassium, sodium and the like.

In connection with the coating method, a conductive polymer can be formed by polymerizing monomers in the existence of reinforcing short fibers. To explain in detail, for example when the conductive polymer is polypyrrole and the reinforcing short fibers are nylon, it is formed by putting the fibers into an aqueous solution of ferric chloride (6) hydrate ($FeCl_3$–$6H_2O$), stirring the solution to diffuse the fibers, adding an aqueous solution of pyrrole, stirring the solution for several hours to allow them to conjugate-bond, taking out the fibers through a filter, washing the fibers in the water and methanol, and finally vacuum drying the fibers.

As the result, nylon short fibers coated with polypyrrole which has a good conductivity can be obtained.

On the other hand, if the conductive substance is a metal salt, various plating methods such as an electroplating method and a vacuum evaporation method may be used.

The quantity of the conductive substance for the coat is set in the range of not more than 1 parts by weight with respect to 100 parts by weight of the reinforcing short fibers. The thickness of the coat is about 0.02 to about 0.1 mm.

The above-mentioned base rubber compound contains, as rubber bas, one of or a combination of diene rubbers such as natural rubber (NR), styrene butadiene rubber (SBR), butadiene rubber (BR), isoprene rubber (IR) and the like.

If SBR is to be used, S-SBR is especially preferable. Further, it is more preferable to use S-SBR whose glassy-transition temperature is not more than −50° C. to decrease the rolling resistance.

Further, conventional additives, for example, rubber reinforcements, sulfur, age resistance and the like may be added in the base rubber compound. For the rubber reinforcements, silica is preferably used because silica shows a low hysteresis loss which helps to decrease the rolling resistance. The silica content is 0 to 100 parts by weight, preferably 0 to 70 parts by weight. For the silica, colloidal silica, of which nitrogen adsorption relative surface (BET) is in the range of from 150 to 250 $m^2$/g and dibutyl phthalate (DBP) oil absorption is in the range of not less than 180 ml/100 g, is preferably used for the rubber reinforcing effect and processing characteristics of the rubber. To minimize the hysteresis loss, the conductive rubber compound 10 preferably contains no carbon black. However, it is possible to use carbon black. For the carbon black, furnace black (SAF, ISAF and HAF), acetylene black, ketten black can be used.

The carbon black content is 0 to 45 parts by weight. If the carbon black is more than 45 parts by weight, the hysteresis loss increases and the rolling resistance increases. Further, the electrical resistance is fully decreased by the carbon which makes it not necessary to add the conductive short fibers.

Instead of silica and carbon black, the short fibers can be used as a rubber reinforcement. In this case, the hysteresis loss further decreases and a minimal rolling resistance may be obtained. However, it is better to limit the short fibers content to not more than 30 parts by weight as explained above.

Accordingly, the conductive short fibers contact each other and the rubber compound 10 is provided with a good conductivity required for the tire. Further, the required conductivity can be obtained by a minimal conductive substance, and the quantity thereof is greatly reduced in comparison with a method in which such conductive substance is directly added to the base rubber.

The sidewall rubber and bead rubber forming the sidewall portions 3 and bead portions 4 are made of a conductive rubber compound having a volume resistance of less than $1 \times 10^8$ ohm cm. This conductivity is however provided by carbon black according to a conventional method.

The electrical resistance of the tire between the tread face and rim wheel should be less than $1 \times 10^8$ ohm cm. Further, it is preferable to maintain less than $1 \times 10^9$ ohm cm even after running for 1000 km.

Figure 2:
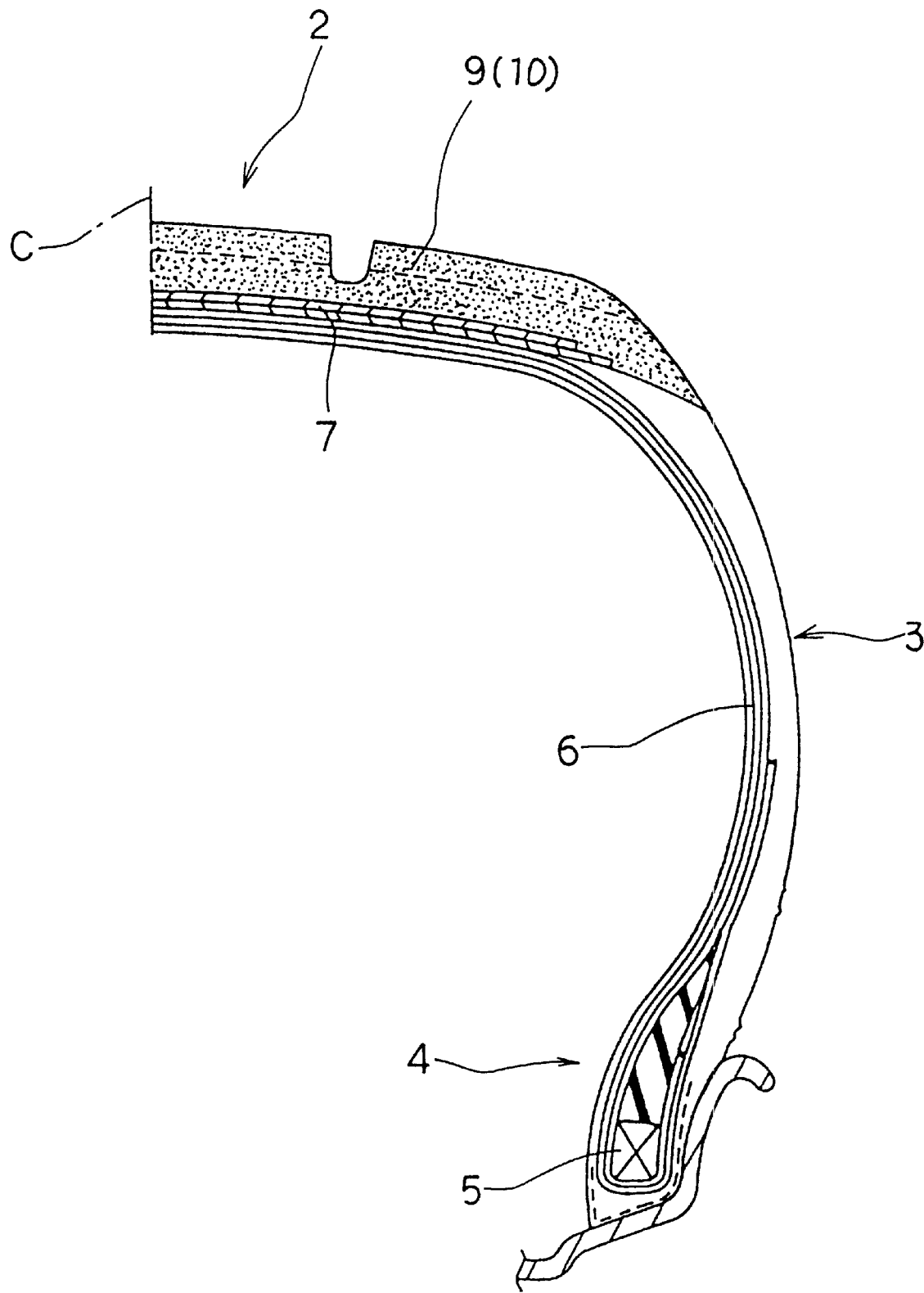
FIG. 2 is a cross sectional view of an embodiment of the present invention.

FIG. 2 shows an embodiment of the present invention which is a pneumatic radial tire for passenger cars.

The carcass 6 is composed of two plies of cords arranged radially at an angle of from 75 to 90 degrees with respect to the tire equator C. Each ply is turned up around the bead cores 5 from the axially inside to outside of the tire to form a pair of turnup portions and a main portion therebetween The belt 7 is composed of two cross plies of parallel cords laid at an angle of not more than 30 degrees, in this example about 24 degrees with respect to the tire equator C.

In this embodiment, the tread rubber 9 disposed on the radially outside of the belt 7 is made of the conductive rubber compound 10 only.

Comparison Test 1

Various rubber compounds were made changing the contents of the conductive short fibers, silica, carbon black and the like as shown in Table 1, and the various characteristic were measured. Further, using those compounds as tread rubber, test tires were made and the electrical resistance was measured.

The method of making the rubber compounds was as follow. First, the diene rubber materials shown in Table 1 were mixed up with a banbury mixer at about 150° C. for four minutes. Then, this rubber mixture and 1.0 parts by weight of sulfur and 1.5 parts by weight of vulcanization accelerator were further mixed up with biaxial calender rolls at 80° C. for about four minutes. This mixture was used as raw tread rubber to build a raw tire and also vulcanized at 170° C. for ten minutes to make specimen for measuring the volume resistance, wear resistance and loss tangent.

Loss factor test: The loss factor or loss tangent of each of the rubber compounds was measured with a viscoelastic spectrometer under the following conditions: dynamic distortion 2.0%, frequency 10 Hz, temperature 60° C. In Table 1, the reciprocals of the measured values are shown using an index based on that Ref. 1 is 100. The larger the value, the lower the loss tangent, that is, better.

Wear resistance test: The amount of wear of each rubber compound was measured with using a Lanbone wear tester under the following conditions: rotational surface speed 50 m/min, load 1.5 kgf, slip rate 30% and 50% and sand discharge 15 g/min. In Table 1, the mean value of two results at two slip rates is indicated by an index based on that Ref.1 is 100. The larger the value, the better the wear resistance.

Volume resistance test: The volume resistance was measured, using a 15 cm ×15 cm ×2 mm test piece under the following conditions: applied voltage 500 Volts, temperature 25° C., humidity 50%. The results are shown in Table 1.

Figure 3:
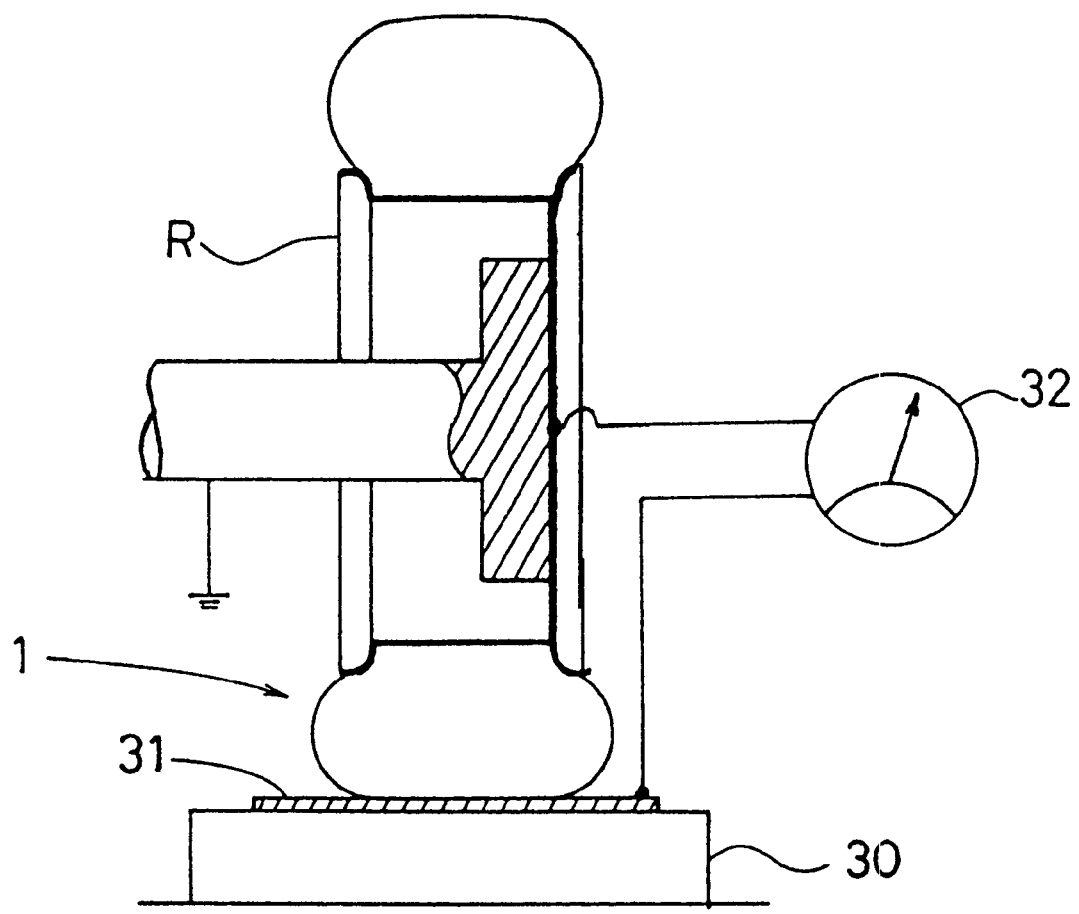
FIG. 3 is a diagram for explaining a method of measuring the electrical resistance of a tire.

Tire electrical resistance test: The raw tread rubber was applied to a raw tire cover to form a green tire and then the tire was vulcanized at 170° C. for ten minutes to make a 175/70R13 tire. The tire electrical resistance was measured according to a German method, WDK, Blatt 3. As shown in FIG. 3, the tire 1 mounted on a standard rim R and inflated to a pressure of 20 kpa was placed on a steel plate 31 electrically isolated from a table 30. Then a load of 450 kg was applied to the tire. On this condition, the electrical resistance between the rim R and the steel plate 31 was measured with a ohm meter 32. The applied voltage was 500 volts, the temperature was 25° C., and the humidity was 50%.

TABLE 1

| Tire (comparison test 1) | Ref. 1 | Ref. 2 | Ex. 1 | Ex. 2 | Ex. 3 | Ex. 4 | Ex. 5 | Ref. 3 | Ex. 6 | Ex. 7 | Ref. 4 | Ref. 5 | Ref. 6 | Ex. 8 | Ex. 9 |
|---|---|---|---|---|---|---|---|---|---|---|---|---|---|---|---|
| Diene rubber | | | | | | | | | | | | | | | |
| NR | 50 | 50 | 50 | 50 | 50 | 50 | 50 | 50 | 50 | 50 | 50 | 50 | 50 | 50 | 50 |
| SBR | 50 | 50 | 50 | 50 | 50 | 50 | 50 | 50 | 50 | 50 | 50 | 50 | 50 | 50 | 50 |
| Silica | 50 | 50 | 50 | 50 | 50 | 50 | 50 | 50 | 25 | 50 | 30 | 20 | — | 30 | 20 |
| Carbon black | — | — | — | — | — | — | — | — | — | — | 20 | 30 | 50 | 20 | 30 |
| Silane coupling agent | 5 | 5 | 5 | 5 | 5 | 5 | 5 | 5 | 2.5 | 5 | 3 | 2 | — | 3 | 2 |
| Process oil | 10 | 10 | 10 | 10 | 10 | 10 | 10 | 10 | 0 | 10 | 10 | 10 | 10 | 10 | 10 |
| Wax | 2 | 2 | 2 | 2 | 2 | 2 | 2 | 2 | 2 | 2 | 2 | 2 | 2 | 2 | 2 |
| Age resistance | 1 | 1 | 1 | 1 | 1 | 1 | 1 | 1 | 1 | 1 | 1 | 1 | 1 | 1 | 1 |
| Stearic acid | 4 | 4 | 4 | 4 | 4 | 4 | 4 | 4 | 4 | 4 | 4 | 4 | 4 | 4 | 4 |
| Hydrozincit | 3 | 3 | 3 | 3 | 3 | 3 | 3 | 3 | 3 | 3 | 3 | 3 | 3 | 3 | 3 |
| Sulfur | 1 | 1 | 1 | 1 | 1 | 1 | 1 | 1 | 1 | 1 | 1 | 1 | 1 | 1 | 1 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| conductive short fibers A | — | 1 | 2 | 5 | 10 | 20 | 30 | 40 | 10 | — | — | — | — | 5 | 5 |
| conductive short fibers B | — | — | — | — | — | — | — | — | — | 10 | — | — | — | — | — |
| Loss tangent (index) | 100 | 100 | 100 | 98 | 98 | 97 | 96 | 92 | — | 99 | 96 | 93 | 89 | 96 | 92 |
| Wear resistance (index) | 100 | 99 | 98 | 97 | 93 | 93 | 84 | 71 | — | 94 | 98 | 100 | 101 | 97 | 97 |
| Volume resistance* (ohm cm) | 14.3 | 13.9 | 11.9 | 10.1 | 8.2 | 7.2 | 6.6 | 6.5 | 8 | 9 | 13 | 11.9 | 6.6 | 8.6 | 6.6 |
| Tire electrical resistance* (ohm) | 9.7 | — | 8.1 | — | 6.3 | — | — | — | — | — | — | — | 2.2 | — | 6.3 |

*logarithmic indication
Conductive short fibers A:
Fibers: nylon fibers, L = 800 micro meters, D = 16 micro meters
Conductive substance: polypyrrole resin
Conductive short fibers B:
Fibers: nylon fibers, L = 400–600 micro meters, D = 16 micro meters
Conductive substance: polypyrrole resin The comparison of Ref.1 to 3 and Ex.1 to 5 shows that the volume resistance decreases as the conductive short fiber content increases. However, when the content is less than 2 parts by weight, the rate of decrease of the resistance becomes small. Contrary, when the content exceeds 30 parts by weight, the rate of decrease of the wear resistance becomes undesirably large.

The comparison of Ex.3 and Ex.6 shows that even if the silica content is changed, the effect on reducing the resistance is not changed.

The comparison of Ex.3 and Ex.7 shows that the longer conductive short fibers more reduce the resistance.

The comparison of Ref.4 to 6 and Ex.8 to 9 shows that the electrical resistance can be effectively reduced by the additive action of the carbon black.

Figure 4:
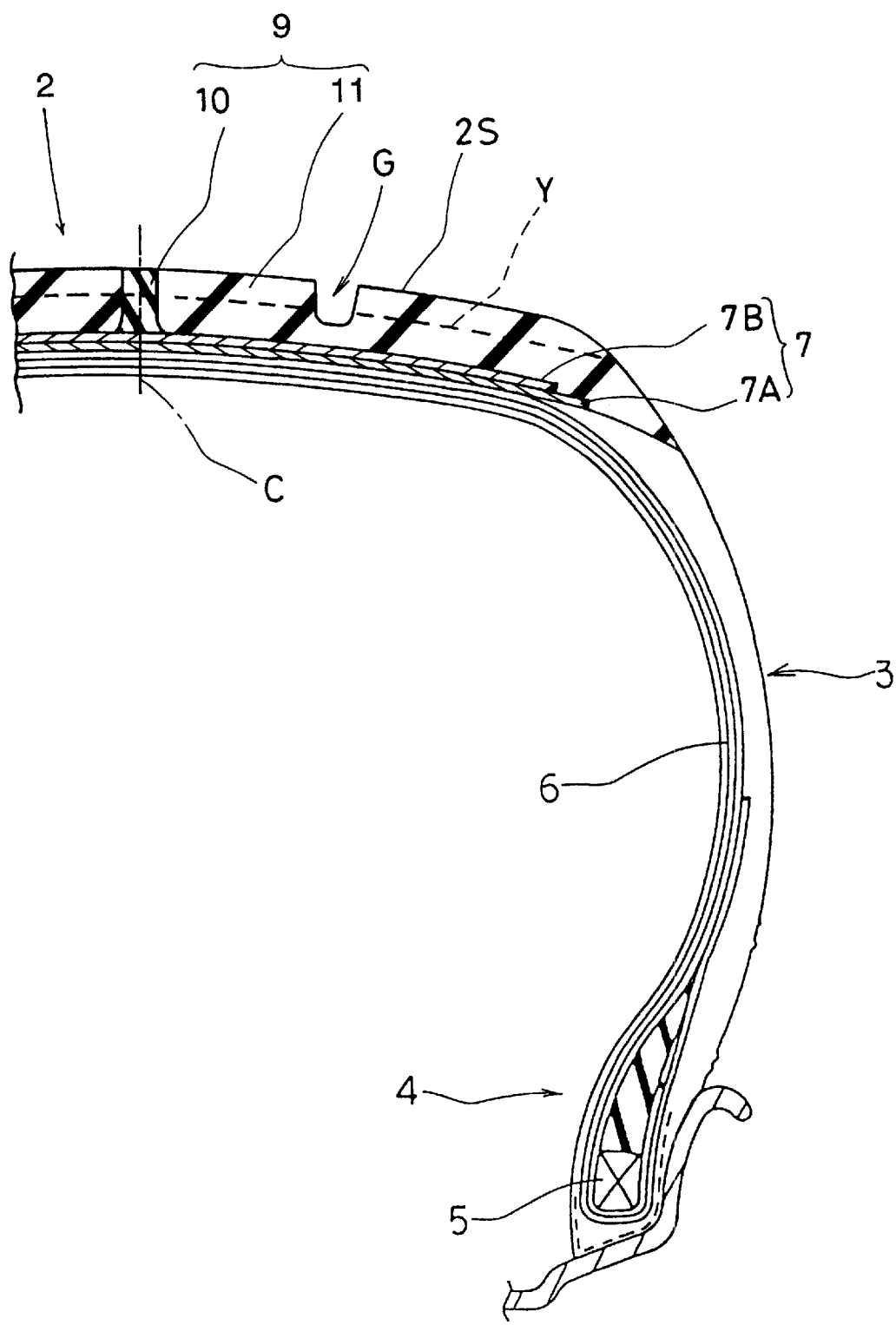
FIG. 4 is a cross sectional view of another embodiment of the present invention.

FIG. 4 shows another embodiment of the present invention. In this embodiment, the tire is a pneumatic radial tire for passenger cars. The carcass 6 and belt 7 are the same structures as in the above-mentioned first embodiment. The tread rubber 9 is however modified. The above-mentioned conductive rubber compound 10 is used partially thereof.

The tread rubber 9 comprises a conductive portion made of the conductive rubber compound 10 and a main portion made of another rubber compound 11.

The main portion 11 is disposed on the radially outside of the belt 7 and the radially outer surface thereof forms most of the tread face 2S. The conductive portion 10 extends from the radially outer surface of the belt 7 to the tread face 2S through the main portion 11 so that the radially outer end thereof forms part of the tread face 2S.

The rubber compound for the main portion 11 is a high preferable rubber designed with much importance attached to the rolling resistance, wear resistance and wet performance rather than the electrical conductivity. In this example, an insulation rubber is used, which is compounded from:

100 parts by weight of rubber base;

30 to 100, preferably 40 to 70, more preferably 40 to 60 parts by weight of silica; and not more than 30, preferably not more than 10, more preferably substantially 0 parts by weight of carbon black.

For the rubber base, one of or combination of diene rubber such as natural rubber (NR), styrene-butadiene rubber (SBR), isoprene rubber (IR), butadiene rubber (BR), acrylonitril-butadiene rubber (NBR), chloroprene rubber (CR) can be used. In particular, NR, IR, BR and SBR are preferably used.

Further, various additives such as sulfur, vulcanizing agent, vulcanization accelerator, plasticizer, age resistance, silane coupling agent and the like may be added. For the silane coupling agent, bis(trietxylylpropyl)tetra sulfide and alpha-mercaptpropyltrimetoxysilane are suitably used. Therefore the volume resistance of this rubber may be more than $1 \times 10^8$ ohm cm.

Also this compound can be used as the above-mentioned base rubber compound of the conductive rubber compound 10.

Figure 5:
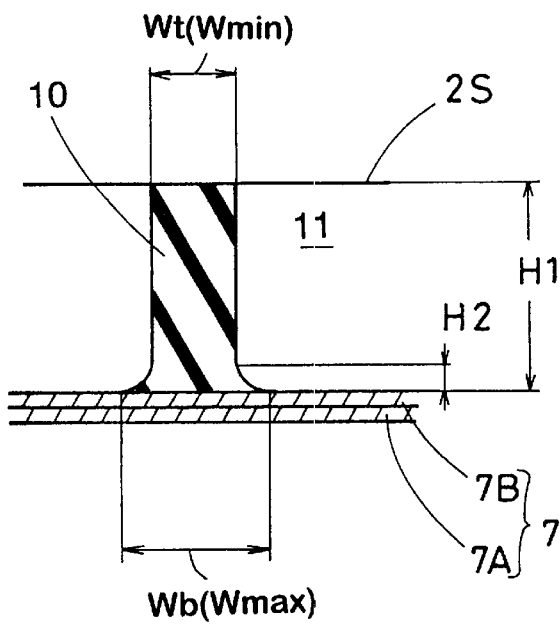

FIGS. 4 and 5 show an example of the conductive portion 10. In this example, the main part of the conductive portion 10 extending from the radially outer end to the vicinity of the inner end has a substantially constant width Wt, but the root part radially inside of the main part is gradually widened towards the radially inside to increase the contact area with the belt 7 and also to prevent a stress concentration. In the cross section thereof, the contour of the root part may be a part of an inscribing circle. The radial height H2 of the root part is not more than 20% of the over all height H1 of the conductive portion 10, and the maximum width Wmax is about 1.2 to 5 times the width Wt of the main part.

This conductive portion 10 extends continuously in the tire circumferential direction, and disposed in the tread central region for example on the tire equatorial line.

In the tread portion, circumferential grooves G are disposed at a distance from the conductive portion 10. However, it is possible that axial grooves Y cross the conductive portion 10. The above-explained circumferentially continuously extending conductive portion 10 means that this portion is materially continuous in the under tread part. Further, it is also possible to form this conducive portion 10 in two or more axial positions.

Figure 6:
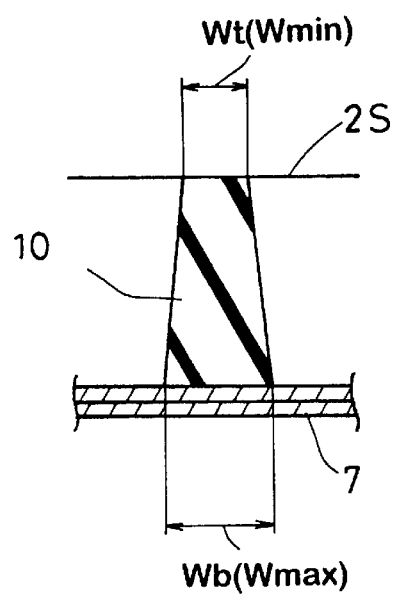
FIGS. 5–8 are enlarged cross sectional views each showing an example of the conducive portion thereof.
Figure 8:
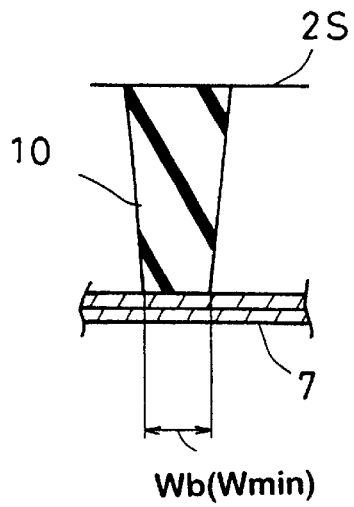
Figure 7:
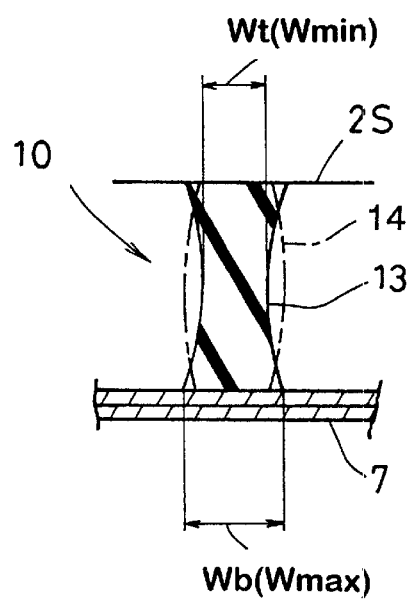

FIGS. 6, 7 and 8 show modifications of the sectional shape of the conducive portion 10.

In FIG. 6, the axial width gradually decreases from the inner end to the outer end.

In FIG. 7, the axial width gradually increases from the middle to both the inner and outer ends to form a narrow width portion 13.

The minimum width Wmin is preferably in the range of from 1.0 to 0.4 times the maximum width Wmax at the inner end.

In FIG. 8, the axial width gradually increases from the inner end to the outer end.

Further, as shown in FIG. 7 by chain line, it is possible to decrease the width from a central wide portion 14 to both the inner and outer ends. The volume V1 of the conductive portion 10 is 2% to 20% of the total volume V0 of the tread rubber 9, whereby it becomes possible to provide a high performance tire in which a good conductivity by the conductive portion and a superior wear resistance, rolling resistance and wet performance by the main portion of the silica base compound can be achieved. If the V1/V0 rate is more than 20%, the wear resistance, rolling resistance and wet performance are deteriorated. If less than 2%, the electrical conductivity becomes insufficient.

Comparison test 2

In the same way as explained above, test pieces and test tires of 175/70R13 size were made, and the volume resistance of the compound and the electrical resistance, rolling resistance, wear resistance and wet performance of the tire were measured.

Volume resistance test: The volume resistance was measured as mentioned above. The value of not more than 12 is preferable.

Rolling resistance test: The test tire was mounted on a standard rim R and inflated to 200 kpa and the rolling resistance was measured at a speed of 80 km/h and a tire load of 345 kg, using a tester. In Table 2, the results are indicated by an index based on Ref.1 being 100. The larger the index, the better the rolling resistance.

Wear resistance test: A passenger car provided with test tires mounted on a standard rim R and inflated to 200 kpa was run on expressways and highways for 30000 km, and the depth of the tread grooves was measured. The results are indicated by an index based on Ref.1 being 100. The larger the index, the better the wear resistance.

Wet preferable test: The test car was run on a wet tiled test course with a very low frictional coefficient along a circle and the critical cornering speed was measured. In Table 2, the results are indicated by an index based on Ref.1 being 100. The larger the index, the better the wet performance.

Tire electrical resistance test: The electrical resistance of test tire was measured as explained as above. The value of not more than 8 is preferable.

TABLE 2

| Tire (comparison test 2) | Ref. 1 | Ref. 2 | Ex. 1 | Ex. 2 | Ex. 3 | Ref. 3 | Ex. 4 | Ex. 5 | Ex. 6 | Ref. 4 | Ex. 7 | Ex. 8 | Ex. 9 | Ex. 10 |
|---|---|---|---|---|---|---|---|---|---|---|---|---|---|---|
| Tread rubber | | | | | | | | | | | | | | |
| Main portion | | | | | | | | | | | | | | |
| Diene rubber | | | | | | | | | | | | | | |
| NR | | | | | | | | 50 | | | | | | |
| SBR | | | | | | | | 50 | | | | | | |
| Silica | | | | | | | | 50 | | | | | | |
| Silane coupling agent | | | | | | | | 5 | | | | | | |
| Process oil | | | | | | | | 10 | | | | | | |
| Wax | | | | | | | | 2 | | | | | | |

TABLE 2-continued

| Tire (comparison test 2) | Ref. 1 | Ref. 2 | Ex. 1 | Ex. 2 | Ex. 3 | Ref. 3 | Ex. 4 | Ex. 5 | Ex. 6 | Ref. 4 | Ex. 7 | Ex. 8 | Ex. 9 | Ex. 10 |
|---|---|---|---|---|---|---|---|---|---|---|---|---|---|---|
| Age resistance | | | | | | | | 1 | | | | | | |
| Stearic acid | | | | | | | | 4 | | | | | | |
| Hydrozincit | | | | | | | | 3 | | | | | | |
| Sulfur | | | | | | | | 1 | | | | | | |
| Vulcanization accelerator | | | | | | | | 1.5 | | | | | | |
| Conductive portion | | | | | | | same compound as Main portion + Fibers | | | | | | | |
| Conductive short fibers A | — | 1 | 2 | 10 | 30 | 40 | — | 10 | 10 | 10 | 10 | 10 | 10 | 10 |
| Conductive short fibers B | — | — | — | — | — | — | 10 | — | — | — | — | — | — | — |
| V1/V0 (%) | 0 | 10 | 10 | 10 | 10 | 10 | 10 | 2 | 20 | 30 | 10 | 10 | 10 | 10 |
| L/D (%) | 0 | 31 | 31 | 31 | 31 | 31 | 31 | 31 | 31 | 31 | 800 | 2000 | 5 | 2500 |
| Volume resistance *1 (ohm cm) | 14.3 | 13.9 | 11.9 | 8.4 | 6.6 | 6.5 | 8 | 8.4 | 8.4 | 8.4 | 7.8 | 6.6 | 13.7 | 6.5 |
| Tire electrical resistance *1 (ohm) | 9.7 | — | 8 | 6.3 | — | — | 6.2 | 6.9 | 6 | — | — | 6.3 | — | — |
| Rolling resistance (index) | 100 | 100 | 100 | 98 | 96 | 88 | 98 | 99 | 94 | 84 | 96 | 92 | 98 | 88 |
| Wear resistance (index) | 100 | 99 | 98 | 95 | 92 | 85 | 94 | 95 | 92 | 85 | 93 | 90 | 96 | 85 |
| Wet preferable (index) | 100 | 99 | 98 | 97 | 94 | 86 | 97 | 100 | 93 | 83 | 95 | 93 | 97 | 86 |

*1 logarithmic indication
Conductive short fibers A:
Fibers: nylon fibers, L = 50 micro meters, D = 16 micro meters
Conductive substance: polypyrrole resin
Conductive short fibers B:
Fibers: pulp
Conductive substance: polyaniline resin Table 2 shows that when the conductive rubber compounds contain 2 to 30 parts by weight of conductive short fibers, the electrical conductivity, rolling resistance, wear resistance, wet performance can be improved to a high level in a well balanced manner by setting the volume ratio V1/V0 in the range of 2 to 20%.

As explained above, in this embodiment, as the tread rubber comprises functionally different compounds, the tire is effectively improved in the conductivity, wear resistance, rolling resistance and wet performance.

Figure 9:
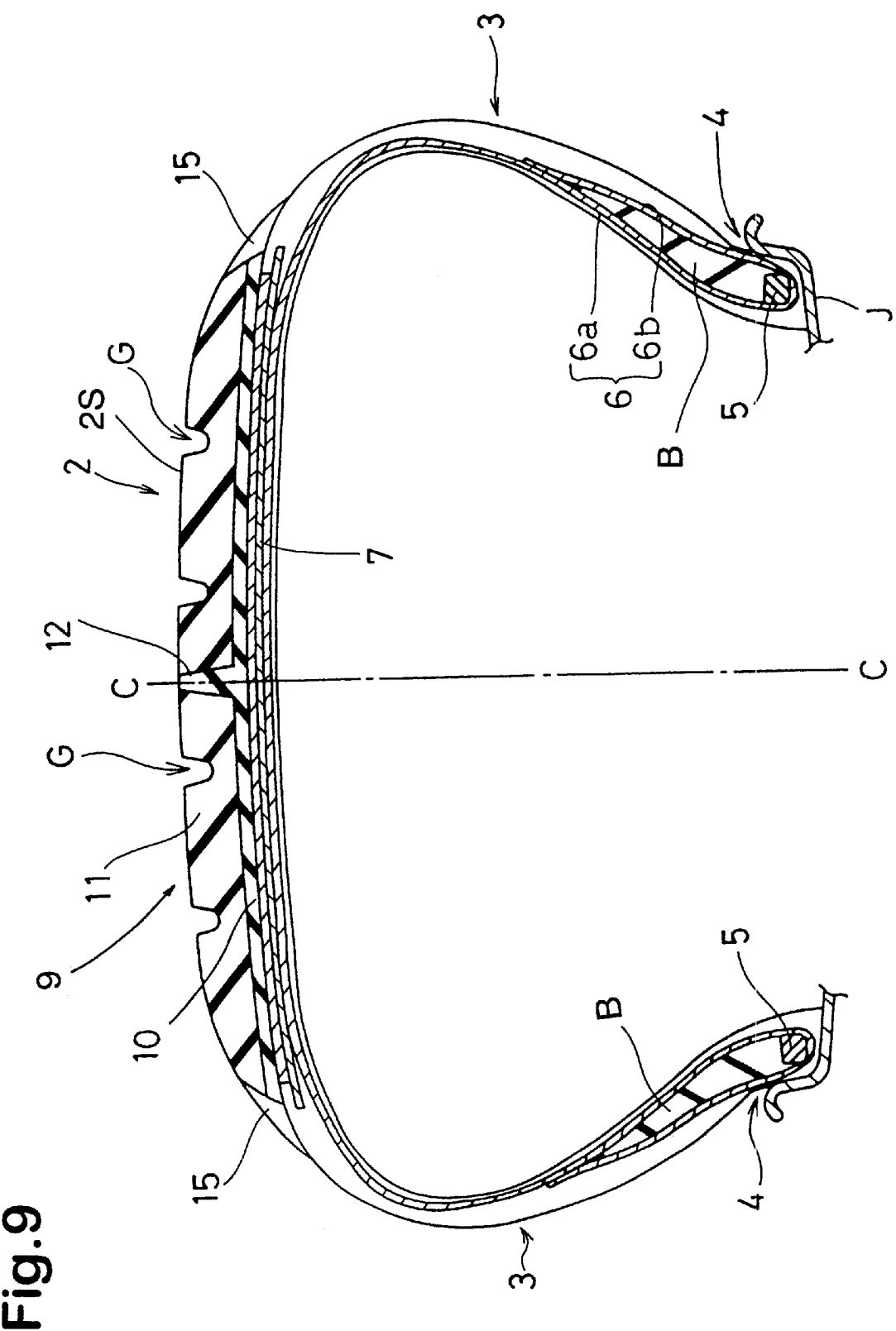
FIG. 9 is a cross sectional view of still another embodiment of the present invention.

FIG. 9 shows still another embodiment of the present invention. In this embodiment the tire 1 is also a passenger car radial tire having a relatively low aspect ratio.

In this example, the carcass 6 comprises one ply of cords arranged radially at an angle of from 75 to 90 degrees with respect to the tire equator C, and turned up around the bead cores in the bead portions to form a pair of turnup portions 6b and a main portion 6a therebetween.

The belt 7 comprises two radially inner and outer cross plies whose cords are laid at angles of from 15 to 40 degrees with respect to the tire equator C. In this example, steel cords are used as the belt cords to provide a good electrical conductivity.

In this embodiment, the conducive rubber compound 10 is used partially.

The tread rubber 9 comprises a base tread portion 10 and a cap tread portion 11.

The base tread portion 10 is disposed on the radially outside of the belt 7 and made of the conductive rubber compound 10 to have a volume resistance of less than about 1×10$^8$ ohm cm. The width of the base tread portion 10 is substantially the same as the width the belt 7. The thickness thereof is substantially constant all over the width.

The cap tread portion 11 is disposed on the radially outside of the base tread portion so that the radially outer surface defines most of the tread face 2S. The width thereof is substantially the same as the base tread portion 10.

In order to reduce the rolling resistance, the cap tread portion 11 is made of the same compound as the main part of the tread rubber in the second embodiment. That is, a compound reinforced by mainly silica is used. And the carbon black contents is preferable about 3 to 20 parts by weight with respect to 100 parts by weight of the diene rubber to fulfill the requirements for the cap tread portion 11 such as elasticity, hardness, heat generation and the like. If the carbon black content exceeds 20 parts by weight, the excellent effect of silica such as low rolling resistance decreases and the rubber is liable to loss suppleness. As mentioned above, the upper limit of silica content is 100 parts by weight. If exceeds 100, it becomes difficult to limit the carbon black content in the preferable range. And photo-oxidative degradation is liable to occur which decreases the weather resistance. Thus the cap tread portion 11 is an insulation rubber of which volume resistance is more than 1×10$^8$ ohm cm.

Preferable, the ratio (h1/h2) of the thickness h1 of the cap tread portion 11 to the thickness h2 of the base tread portion 10 is set in the range of 1.5 to 4.0.

To discharge electricity to the ground, a circumferentially continuous conductive portion 12 or a plurality of circumferential spaced conductive portions 12 are provided in the ground contacting area 2S. The conductive portion 12 extends from the base tread portion 10 to the tread face 2S to penetrate the cap tread portion 11. The base tread portion 10 and conductive portions 12 are made of the conductive rubber compound having a volume resistance of less than 1×10$^8$ ohm cm.

In FIG. 9, the conductive portion 12 is disposed along the tire equator C so as to be able to contact with the ground at a sufficient ground pressure during cornering as well as straight running. However, it is also possible to form the conductive portion 12 in two or more axial positions, for example on each side of the tire equator C.

Aside from the circumferentially continuously extending conductive portion 12, it can be formed like a independent pole or column. In a cross section parallel to the tread, the cross sectional shape may be formed as a circle, rectangle and the like. Such independent conductive portions can be arranged in a circumferential row or rows. Further, a scattered arrangement is also possible. In any case, the arrangement should be such that one or more conductive portions always appear in the ground contacting patch of the tire. Preferably, the corner between the base tread portion 10 and the conductive portion 12 at the radially inner end 12b thereof is rounded to avoid a stress concentration.

The axial width Wt of the conductive portion 12 at the outer end 12t or the tread face 2S is preferably set in the range of 0.5 to 20.0 mm more preferable 5 to 20 mm. If the width Wt is less than 0.5 mm, the electrical contact resistance with the road surface becomes unstable. If the width Wt exceeds 20 mm, the conductive portion 12 is liable to hinder the cap tread portion 11 from improving the rolling resistance and wet performance.

To avoid cracking at the inner end 12b, the conductive portion 12 is provided radially outward of the inner end 12b with a narrow width part 13 narrower than the inner end 12b. The minimum axial width in the narrow width part 13 is preferably in the range of 60 to 80% of the maximum width Wb at the inner end.

Figure 10:
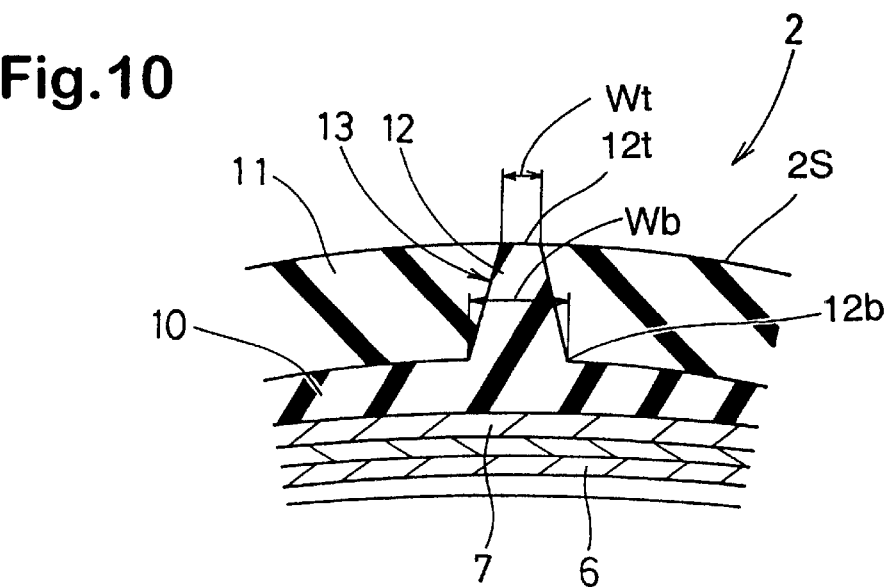
FIG. 10 is an enlarged cross sectional view showing an example of the conducive portion thereof.

In FIG. 10, the narrow width part 13 is formed at the outer end 12t, and the width gradually decreases from the inner end 12b to outer end 12t so that the width becomes minimum at the tread face 2S.

Figure 11:
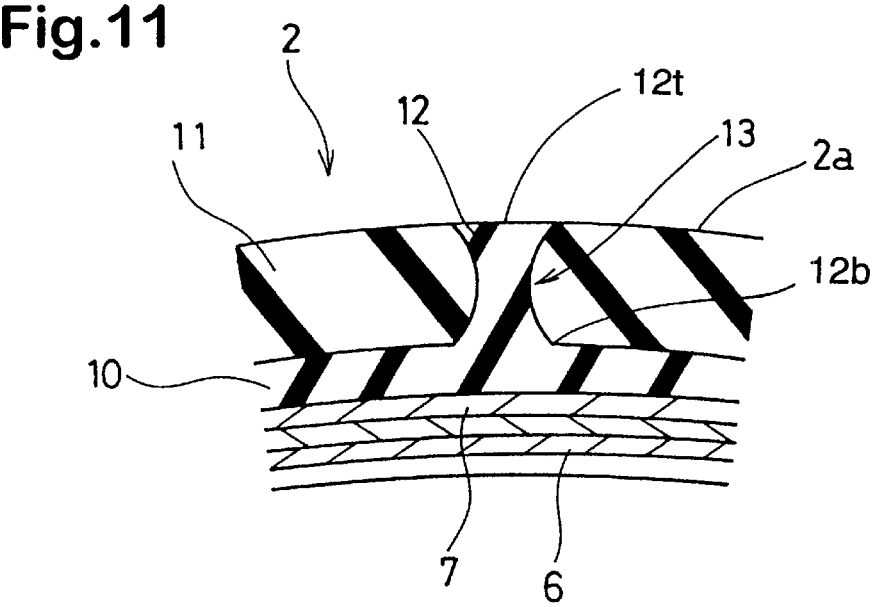
FIG. 11 is an enlarged cross sectional view showing another example of the conducive portion.

FIG. 11 shows another example of the conductive portion 12 in which the narrow width part 13 is formed in the middle of the radial extent of the conductive portion 12. The width is increased gradually from the narrow width part 13 to both the outer end 12t and inner end 12b and the outer end 12t and inner end 12b are substantially the same axial width.

Figure 12:
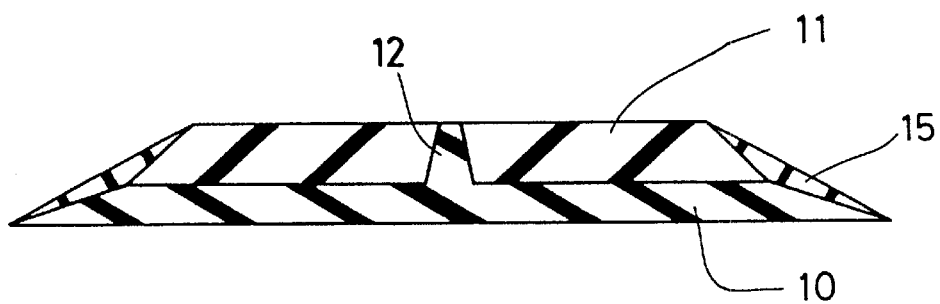
FIG. 12 is a cross sectional view of an assembly of the cap tread portion and base tread portion formed by an extruder.

FIG. 12 shows a cross section of a strip of raw tread rubber. The raw rubber compounds for the cap tread portion, base tread portion and conductive portion are extruded from the dies of a extruder and united in one body as raw tread rubber. Such a strip is skived and wound around the circumference of the tire, and the circumferential ends are spliced. Thus, in the tread portion of the tire, 90% or more of the conductive short fibers are oriented in the tire circumferential direction. As a result, the base tread portion 10 has a directional elastic modulus such that the complex elastic modulus E*c in the tire circumferential direction is not less than 1.1 times the complex elastic modulus E*a in the tire axial direction, whereby the rigidity in the tire circumferential direction can be increased without sacrificing the rid comfort.

In this example, the tread rubber further includes wing rubbers 15 disposed at the axial ends of the cap tread portion 11 and base tread portion 10.

The carbon black content of the conductive rubber compound is preferably not more than 35 parts by weight with respect to 100 parts by weight of the rubber bas. If the carbon black exceeds 35 parts by weight, the hysteresis loss of the rubber has a tendency to increase.

Further, when the short fibers content is increased enough for providing a sufficient reinforcing effect to the conductive rubber compound, it is possible to decrease carbon black to substantially zero, which helps to further improve the rolling resistance and conductivity.

If silica is to be added together with the conductive short fibers to decrease the hysteresis loss, the silica content is preferably limited to not more than 10 parts by weight. However, it is more preferable to decrease the silica content to zero.

In the conductive rubber compound and the insulation rubber compound, the carbon black is not limited to a specific sort of carbon black, but carbon black whose particle diameter is not more than 30 nm, that is, hard carbon is preferably used.

In this embodiment, the cap tread portion 11 is reinforced by silica and the base tread portion 10 is reinforced by the conductive short fibers and optional minimal carbon black. Therefor the hysteresis losses of both the rubbers 10 and 11 are low. In such condition, by further decreasing the loss tangent of either of the cap tread portion 11 and base tread portion 10, the rolling resistance can be further decreased while maintaining a good rid comfort. If the base tread portion 10 is decreased relatively, it is preferable because the heat generation during running is reduced on the inner side of the tire. It is however more preferable that the cap tread portion 11 is decreased relatively, because the cap tread portion 11 is more effective than the base tread portion 10 on decreasing the rolling resistance. In this example, therefor, the loss tangent of the base tread portion 10 is less than that of the cap tread portion 11.

In this embodiment, the wide conductive base tread portion is disposed at the radially inner end of the conductive portion to extend along the belt, and at least the axial edges of the base tread portion are electrically connected with the sidewall rubber and then bead rubber. Accordingly, it is not always necessary to use a steel belt.

Comparison test 3

Pneumatic radial tires (size: 205/65R15) having the structure shown in FIG. 9 were made by way of test using various tread rubber compounds shown in Table 3, and tested for the rolling resistance, electrical resistance and wet performance. The test results are shown in Table 4.

In the test tires, the bead portions and sidewall portions were made of a rubber compound having a volume resistance of about $1 \times 10^7$ ohm cm. The base tread portions 5 to 8 were the same complex elastic modulus ratio (E*c/E*a) of 1.1.

Incidentally, in the present invention, the complex elastic modulus E* and loss tangent are measured with a viscoelastic spectrometer under the following conditions: temperature 70° C., initial elongation 10%, dynamic distortion plus/minus 1%, frequency 10 hz.

TABLE 3

| Compound | cap tread | | | base tread | | | | | | |
|---|---|---|---|---|---|---|---|---|---|---|
| No. | 1 | 2 | 3 | 4 | 5 | 6 | 7 | 8 | 9 | 10 |
| NR | 30 | 30 | 30 | 50 | 50 | 50 | 50 | 50 | 50 | 50 |
| S-SBR | 50 | 50 | 50 | | | | | | | |
| BR | 20 | 20 | 20 | 50 | 50 | 50 | 50 | 50 | 50 | 50 |
| Silica | 70 | 55 | 25 | | | | | | | |
| Carbon A | | 15 | 45 | | | | | | | |
| Carbon B | | | | 35 | 35 | 35 | 35 | 35 | 50 | 25 |
| Oil | 40 | 40 | 40 | 5 | 5 | 5 | 5 | 5 | 5 | |
| Silane coupling agent | 5.6 | 4.4 | 2 | | | | | | | |
| conductive fibers 1 | | | | | 1 | 2 | 5 | | | 10 |
| conductive fibers 2 | | | | | | | | 5 | | |
| Volume resistance *1 (ohm cm) | 13.8 | 13.4 | 6.8 | 13.5 | 12.8 | 7.9 | 6.5 | 6.8 | 7.2 | 7.3 |

TABLE 3-continued

| Compound | cap tread | | | base tread | | | | | | |
|---|---|---|---|---|---|---|---|---|---|---|
| No. | 1 | 2 | 3 | 4 | 5 | 6 | 7 | 8 | 9 | 10 |
| Loss tangent | 0.16 | 0.18 | 0.26 | 0.06 | 0.062 | 0.063 | 0.065 | 0.067 | 0.105 | 0.053 |

*1 logarithmic indication
S-SBR: styrene 15%, vinyl 57%, non oil-extended
BR: cis 98%
Silica: BET = 175 m$^2$/g, DBP oil absorption = 210 ml/100 g
Carbon A: primary particle diameter 16 nm
Carbon B: primary particle diameter 28 nm
Conductive fibers 1: L = 800 micro meters, D = 16 micro meters
Conductive fibers 2: L = 400–600 micro meters, D = 16 micro meters

TABLE 4

| Tire (comparison test 3) | Prior | Ref. 1 | Ref. 2 | Ex. 1 | Ex. 2 | Ex. 3 | Ex. 4 | Ex. 5 | Ref. 3 | Ex. 6 |
|---|---|---|---|---|---|---|---|---|---|---|
| Compound No. | | | | | | | | | | |
| Cap tread portion | 2 | 1 | 3 | 1 | 2 | 1 | 1 | 2 | 1 | 6 |
| base tread portion | 9 | 4 | 4 | 6 | 6 | 7 | 8 | 7 | 5 | 10 |
| Rolling resistance (index) | 100 | 107 | 84 | 106 | 104 | 105 | 104 | 102 | 105 | 107 |
| Wet preferable (index) | 100 | 105 | 95 | 105 | 100 | 104 | 100 | 100 | 100 | 100 |
| Tire electrical resistance *1 (ohm) | 6.9 | 12.8 | 6 | 7.6 | 7.3 | 6 | 6 | 6.3 | 11 | 7 |

What is claimed is:

1. A tire comprising:
a tread rubber of which radially outer surface forms the ground contacting face of the tire,
the tread rubber comprising a conductive rubber and a less-conductive rubber,
the conductive rubber forming
a base tread portion which defines the radially inner surface of the tread rubber, and on which the less-conductive rubber is disposed, and
a ground-contacting portion extending radially outwardly from the base tread portion to the ground contacting face,
the conductive rubber being compounded from
100 parts by weight of diene rubber and
2 to 30 parts by weight of conductive short fibers,
the conductive short fibers being formed by coating reinforcing short fibers with a conductive substance selected from the group consisting of a polyaniline and alkyleneoxide, and
the conductive rubber having a volume resistance of less than 1×10$^8$ ohm cm.

2. The tire according to claim 1, wherein the length of the conductive short fibers is 10 to 6000 micro meters, and the length/diameter ratio of the conductive short fibers is 10 to 2000.

3. The tire according to claim 1, wherein the reinforcing short fibers are an organic fiber.

4. The tire according to claim 3, wherein the reinforcing short fibers are a nylon fiber or cellulose fiber.

5. The tire according to claim 1, wherein
said ground-contacting portion forms a circumferentially continuously extending conductive part of the ground contacting face, and
the less-conductive rubber forms a remaining major part of the ground contacting face.

6. The tire according to claim 1, wherein
said ground-contacting portion forms a plurality of circumferentially spaced conductive parts of the ground contacting face, and
the less-conductive rubber forms a remaining major part of the ground contacting face.

7. The tire according to claim 1, wherein
said ground-contacting portion forms a circumferentially continuously extending conductive part and a plurality of circumferentially spaced conductive parts of the ground contacting face, and
the less-conductive rubber forms a remaining major part of the ground contacting face.

8. The tire according to claim 1, wherein
a steel cord belt is disposed immediately inside of the radially inner surface of the tread rubber, and
the volume of the conductive rubber is 2 to 20% of the total volume of the tread rubber, and
the maximum/minimum ratio of the axial width of the conductive rubber is 1 to about 5.

9. The tire according to claim 1, wherein
said ground-contacting portion is provided radially outside of the radially inner end thereof with a narrow width portion.

10. The tire according to claim 1, wherein
the less-conductive rubber is compounded from
100 parts by weight of diene rubber base,
30 to 100 parts by weight of silica, and
3 to 20 parts by weight of carbon black, and
the volume resistance thereof is not less than 1×10$^8$ ohm cm.

11. The tire according to claim 1, wherein
the loss tangent of the conductive rubber in the base tread portion is less than the loss tangent of the less-conductive rubber thereon.

12. The tire according to claim 1, wherein
the base tread portion has a directional complex elastic modulus such that the complex elastic modulus E*c in the tire circumferential direction is not less than 1.1 times the complex elastic modulus E*a in the tire axial direction.

13. The tire according to claim 1, wherein the reinforcing short fibers are selected from the group consisting of nylon, rayon, vinylon, polyethylene, polystyrene, polyvinyl chloride, polyvinylidene chloride, aromatic polyamide, polyethylene terephthalate, polypropylene, cellulose, pulp, glass and alumina.

14. The tire according to claim 1, wherein the axial width of said ground-contacting portion gradually increases from the inner end to the outer end thereof.

15. The tire according to claim 1, wherein the axial width of said ground-contacting portion decreases from a central wide portion to both of the inner and outer ends thereof.

16. The tire according to claim 1, wherein the axial width of said ground-contacting portion increases from a central wide portion to both of the inner and outer ends thereof.

17. The tire according to claims 5, 6, or 7, wherein the base tread portion has a directional complex elastic modulus such that the complex elastic modulus $E^*c$ in the tire circumferential direction is not less than 1.1 times the complex elastic modulus $E^*a$ in the tire axial direction.

* * * * *